US010416729B2

(12) United States Patent
Sun et al.

(10) Patent No.: US 10,416,729 B2
(45) Date of Patent: Sep. 17, 2019

(54) MOUNTING STRUCTURE FOR HARD DISK DRIVES

(71) Applicant: Seagate Technology LLC, Cupertino, CA (US)

(72) Inventors: Hao Sun, Singapore (SG); Aravind Pitty, Singapore (SG); Xiong Liu, Singapore (SG); Ling Ling Zhang, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/276,987

(22) Filed: Sep. 27, 2016

(65) Prior Publication Data

US 2018/0090179 A1   Mar. 29, 2018

(51) Int. Cl.
*G06F 1/18* (2006.01)
*G11B 33/02* (2006.01)
*G11B 33/12* (2006.01)

(52) U.S. Cl.
CPC ............ *G06F 1/187* (2013.01); *G11B 33/124* (2013.01)

(58) Field of Classification Search
CPC .............................. G11B 33/027; G06F 1/187
USPC .................................................... 361/679.34
See application file for complete search history.

(56) References Cited

U.S. PATENT DOCUMENTS

| 5,386,345 A * | 1/1995 | Matsuzaki | D04B 1/16 174/357 |
|---|---|---|---|
| 6,317,318 B1 | 11/2001 | Kim | |
| 6,477,042 B1 | 11/2002 | Allgeyer | |
| 7,667,925 B2 * | 2/2010 | Kim | G11B 5/5582 360/97.19 |
| 8,462,460 B1 | 6/2013 | Szeremeta et al. | |
| 2005/0144808 A1 * | 7/2005 | Vito | B25F 5/006 36/71 |
| 2005/0254682 A1 * | 11/2005 | Maekawa | H04R 9/043 381/404 |
| 2007/0159753 A1 * | 7/2007 | Randall | H05K 9/009 361/111 |
| 2009/0097195 A1 * | 4/2009 | Colligan | G06F 1/187 361/679.34 |
| 2009/0097196 A1 * | 4/2009 | Peng | G06F 1/187 361/679.34 |
| 2010/0086377 A1 * | 4/2010 | de Mola | F16B 5/01 411/176 |
| 2011/0001280 A1 * | 1/2011 | Huang | F16F 1/3732 267/140.4 |
| 2011/0001409 A1 * | 1/2011 | Peng | G06F 1/187 312/301 |
| 2011/0008125 A1 * | 1/2011 | Moon | F16B 5/02 411/108 |

(Continued)

OTHER PUBLICATIONS

"How to Replace or Upgrade Hard Drive on ASUS X550 Series Notebooks," PCNEXUS, http://www.pcnexus.net/2014/04/how-to-replace-or-upgrade-hard-drive-on-asus-x550-notebooks.html. Apr. 7, 2014.

*Primary Examiner* — Rockshana D Chowdhury
(74) *Attorney, Agent, or Firm* — Kagan Binder, PLLC

(57) ABSTRACT

A hard disk drive mounting assembly that includes a disk drive assembly having a base structure that includes a screw hole and a damping insert at least partially surrounding the screw hole. The disk drive assembly further includes a threaded insert positioned in the screw hole of the damping insert.

13 Claims, 6 Drawing Sheets

(56) References Cited

U.S. PATENT DOCUMENTS

2011/0273827 A1* 11/2011 Kasai .................... G11B 33/08
                                              361/679.01
2011/0275268 A1* 11/2011 Harris ................. H02G 3/0481
                                              442/319

* cited by examiner

MOUNTING STRUCTURE FOR HARD DISK DRIVES

BACKGROUND

Hard disk drives are data storage devices that store and retrieve digital information or data using one or more rotating disks that are coated with magnetic material. Data is written to the disks and read from the disks by magnetic heads that are positioned on a moving actuator arm. In more particularity, a transducing head carried by a slider is used to read from and write to a data track on each disk, wherein each slider has an air bearing surface that is supportable by a cushion of air generated by one of the rotating disks. The slider is carried by an arm assembly that includes an actuator arm and a suspension assembly, which can include a gimbal structure.

Computers typically include one or more of these hard disk drives that are mounted into a computer chassis. In order to facilitate such a mounting, the disk drives typically include a housing with a baseplate and cover. These components of the housing provide the primary stiffness and damping to the hard disk drive structure, wherein the material and geometry of the housing components, along with their attachment to other components, determine the robustness and performance of the hard disk drive during shock events and normal operation. As hard disk drives continue to get thinner, such as for mobile device requirements, this robustness is more difficult to maintain, which can result in excessive deflection and undesirable contact between components. This can be particularly true for shock events such as dropping of the device, which can cause both excessive acceleration and deflection of the computer and structures mounted therein.

In presently available systems, the baseplate of the housing is mounted directly to the chassis of the system with a series of screws. However, there is a need to improve the mounting of hard disk drives to a chassis that minimizes the amount of shock that is delivered to the disk, actuator arm, and slider of the hard disk drive during shock events.

SUMMARY

Aspects of the invention described herein are directed providing a system for mounting a hard disk drive to a chassis of a computer. Such mounting systems are designed to improve performance in shock margins and reduce drive distortion that can be caused by uneven mounting of the hard disk drive. In particular, a separated and flexible design for the mounting is provided as an improvement to a rigid baseplate attachment configuration.

In an aspect of the invention, a hard disk drive mounting structure is provided that includes a disk drive assembly with a base attached to a mounting chassis of the disk drive assembly. The attachment structure includes a damping insert surrounding a screw hole and a threaded insert positioned in the screw hole of the damping insert. In more particularity, the damping insert can include a metal rubber material. It is also contemplated that the metal rubber material is configured to be a generally woven structure.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
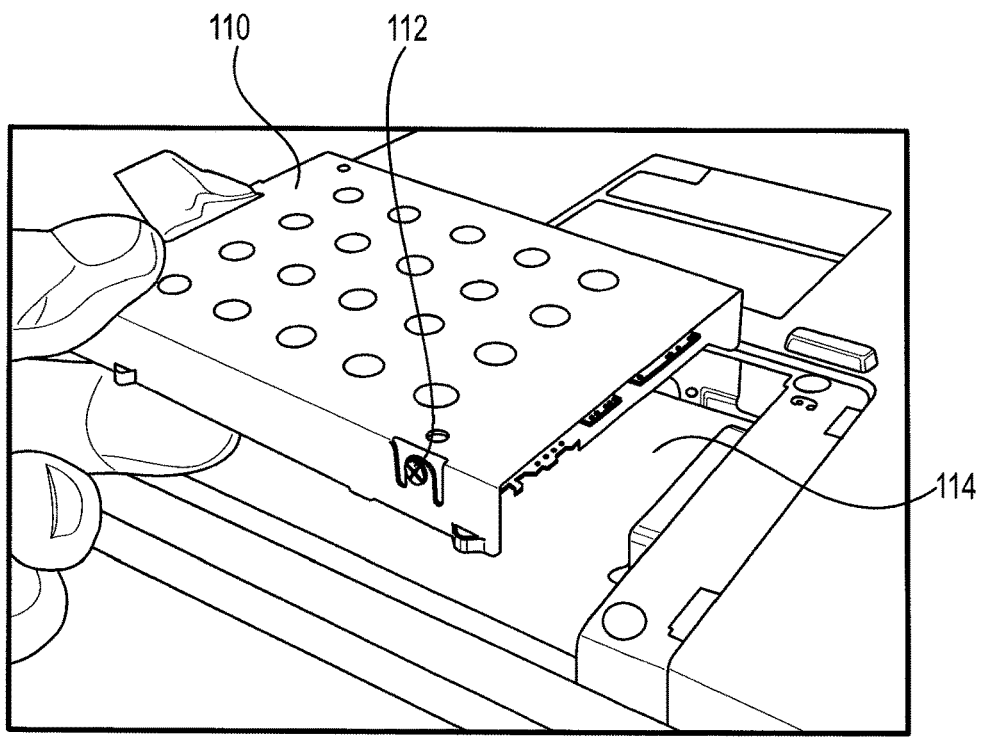
FIG. 1 is a perspective view of a representative notebook computer chassis, including a location for a drive mounting screw.

Referring now to the Figures, wherein the components are labeled with like numerals throughout the several Figures, and initially to FIG. 1 a portion of a conventional notebook computer is illustrated that includes a drive chassis 110 having a mounting hole (not visible) in which a drive mounting screw 112 is positioned. A hard disk drive is positionable within an opening 114 of the chassis 110, wherein the disk drive includes a corresponding screw hole that is alignable with the drive mounting screw 112 of the chassis 110. One exemplary disk drive 120 that can be positioned within chassis 110 and/or chassis 110 is illustrated in FIG. 1, and includes a conventional mounting screw hole 122.

Figure 2:
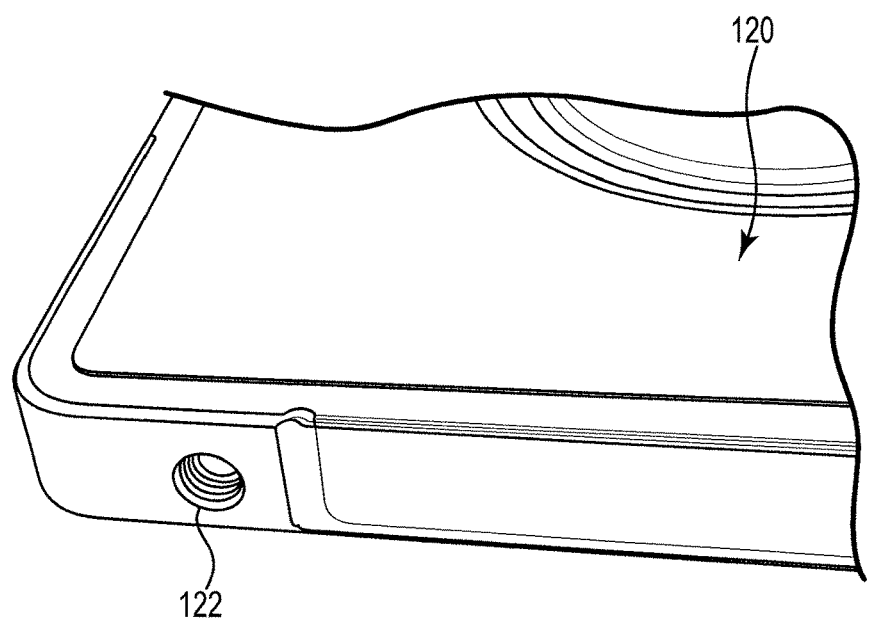
FIG. 2 is a perspective view of a representative hard disk drive for mounting in a chassis, in accordance with the mounting structures of the invention.
Figure 3A:
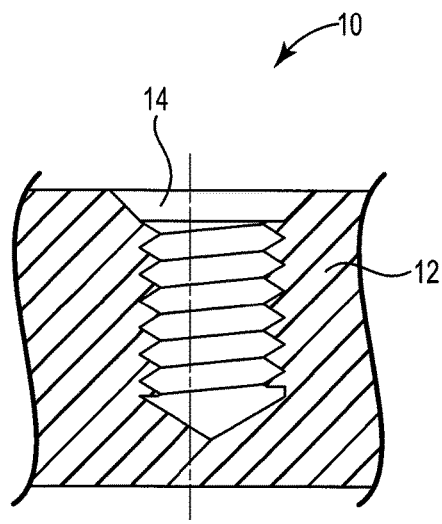
FIG. 3A is a cross-sectional side view of portion of a conventional hard disk drive mounting system.
Figure 3B:
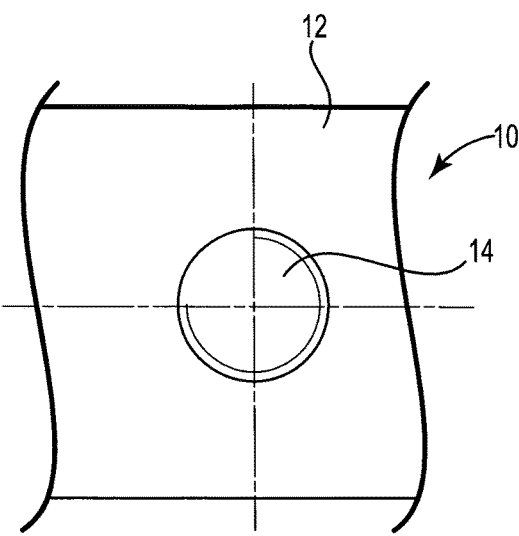
FIG. 3B is a top view of a portion of the conventional hard disk drive mounting system illustrated in FIG. 3A.

Now referring to FIGS. 3A and 3B, a configuration of a portion of conventional mounting system 10 is illustrated for mounting a base of a hard disk drive housing to a chassis of a computer, such as is illustrated above relative to FIGS. 2-3. As shown, the conventional mounting system 10 includes a baseplate 12 having a threaded hole 14 into which a screw can be placed, wherein the threads of the screw will mate directly with those of the hole for a direct connection to the baseplate 12.

Figure 4A:
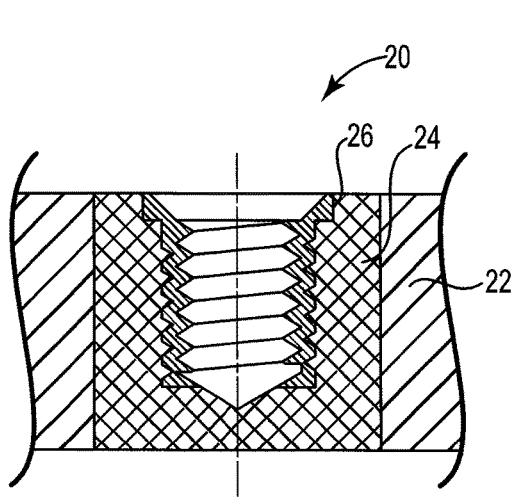
FIG. 4A is a cross-sectional side view of a portion of a hard disk drive mounting system of the invention.
Figure 4B:
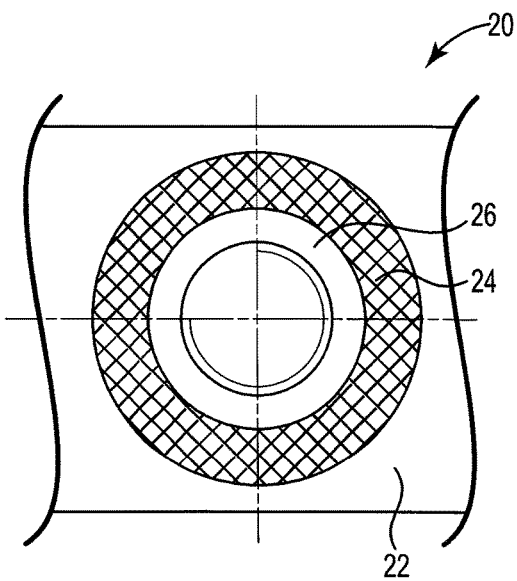
FIG. 4B is a top view of a portion of the hard disk drive mounting system illustrated in FIG. 4A.

FIGS. 4A and 4B illustrate an exemplary configuration of a mounting system 20 of the invention, which includes a baseplate 22 in which an damping insert 24 is positioned, and a threaded insert 26 positioned within the damping insert 24. The damping insert 24 is made of a specialized structural damping material referred to herein as metal rubber, which provides for damping of motion to protect the hard disk drive during shock events, for example. The viscoelastic properties of the metal rubber under shock induces relative movement, contact, and compression between the metal wires of the threaded insert 26. As shown, the threaded insert 26 is enclosed by the metal rubber or damping insert 24 to thereby operate as the common screw hole for the assembly. The friction caused consumes the shock energy of an impact, provides structural damping, and reduces the drive shock amplification and deflection.

In more particularity, the metal rubber in the mounting structure works as a viscoelastic damper between an external load and the hard disk drive. The induced relative movement under shock results in contact, compression, and sliding between deformed metal wires that comprise metal rubber. Part of the external energy is absorbed by the elastic deformation of metal wires, and then transferred as potential energy. The other part of the energy (e.g., shock energy) is consumed by the internal sliding friction of the wires. This dry, sliding friction generated between the wires will generally transform most of the shock energy into thermal energy, thereby providing structural damping. Due to this energy conversion (i.e., transformation and dissipation), the external energy transferred into the disk drive is significantly reduced, thereby reducing drive shock amplification and deflection.

Figure 5:
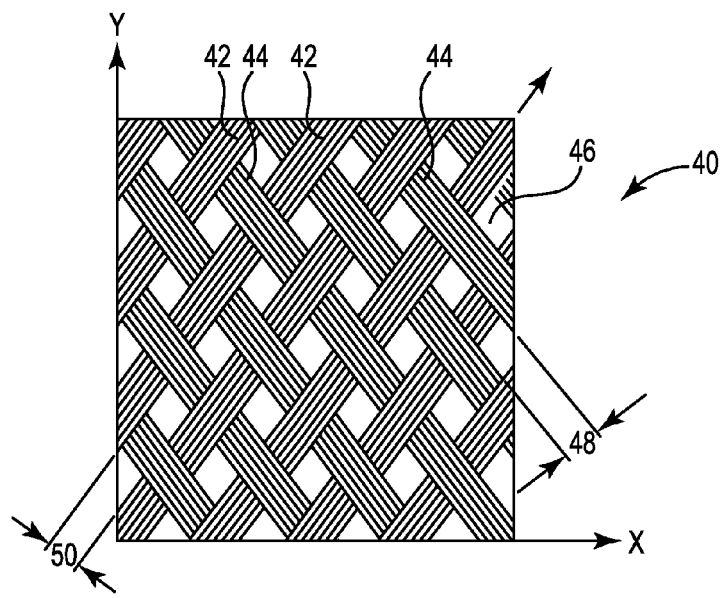
FIG. 5 is a front view of a portion of a metal rubber damper material of the invention, arranged into a weaved configuration.

FIG. 5 illustrates one exemplary configuration of material 40 that can be used as the metal rubber material for the insert 24. As shown, the material 40 includes a consistent weave of first strips 42 extending at an angle in a first direction (i.e., upward from left to right, in the illustration) and second strips 44 extending at an angle in a second direction (i.e., downward from left to right, in the illustration). The configuration of these strips 42, 44 can vary widely and chosen to provide a predetermined amount of damping for the system, wherein in the embodiment of FIG. 5, the first and second strips 42, 44 are woven in such a way that apertures 46 are provided between the weaves. These apertures are shown as being diamond-shaped and having a length 48 in one direction and a length 50 in the other direction. In this embodiment, the lengths 48, 50 are generally equal, although it is contemplated that the lengths 48, 50 can be somewhat or considerably different from each other, depending on the orientation and spacing of the first strips 42 and second strips 44 relative to each other.

In embodiments of the invention, the material 40 is provided with a configuration that provides certain predetermined performance characteristics for the material. That is, in one embodiment of the material 40, the first strips 42 and second strips 44 of the material 40 are made of identical or similar material, such that the width, thickness, and structure of the strips are generally the same. In other embodiments, a number of qualities of the first and second strips 42, 44 can be different from each other to provide for different performance characteristics. For example, the first strips 42 can be made of the same material as the second strips 44, but the thickness and/or width can be different for the two groups of strips. For another example, the first strips 42 can have the same thickness and width as the second strips 44, but the material from which the two strips are made can be different. In another example, the strips within each group of strips (e.g., first strips 42) can possess different material properties within the group itself. In yet another example, the angle 120 can be varied to achieve certain damping qualities of the material. Thus, there are numerous configurations of the metal rubber material that are considered to be within the scope of the present invention, with only a few of the variations described herein.

Figure 6:
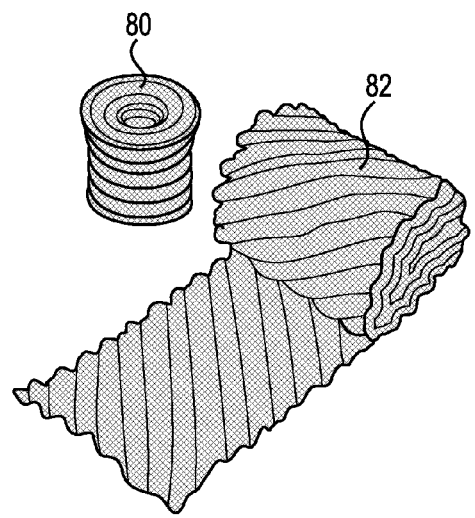
FIG. 6 is a perspective view of the metal rubber material of the invention arranged into a cylindrical configuration and in a roll form.

FIG. 6 includes views of metal rubber material (e.g., material of the type described above relative to FIG. 5) that is configured as a cylinder 80, and the same or similar material as it can be provided in a roll form 82. As will be discussed below relative to the assembly process for providing mounting structures of the present invention, the cylindrical configuration of the material provides for a central opening into which a threaded insert can be positioned.

Figure 7A:
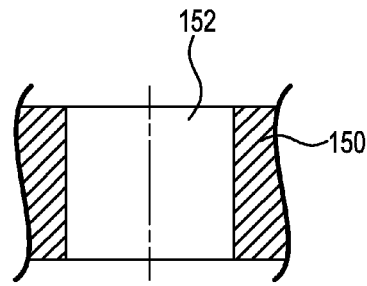
FIG. 7A is a cross-sectional side view of a portion of a disk drive base that includes a hole into which an insert can be positioned, in accordance with the invention.
Figure 8:
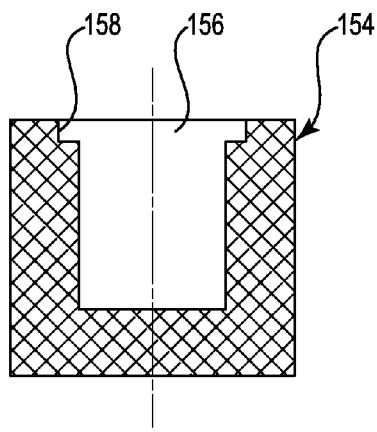
FIG. 8 is a cross-sectional side view of metal rubber material configured as a cylinder to fit into the hole in a disk drive base illustrated in FIGS. 7A and 7B.
Figure 7B:
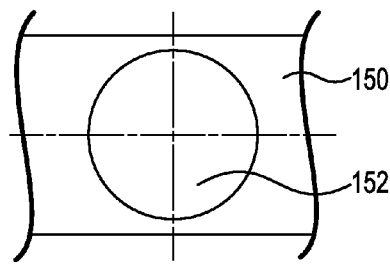
FIG. 7B is a top view of the portion of a disk drive base illustrated in FIG. 7A.

Referring now to FIGS. 7A and 7B, the first step of an assembly process of the invention is illustrated. As shown, a base 150 of a disk drive is illustrated, in which a central hole 152 has been drilled or otherwise formed. As a continuation of this assembly process, FIG. 8 illustrates a cylindrical member 154, which can comprise a metal rubber material of the type described above. This cylindrical member 154 is generally provided to be a damping structure in the disk drive assembly, and therefore can be referred to as a damping insert. The cylindrical member 154 can be woven or otherwise formed in such a manner that its outer diameter generally matches the inner diameter of the hole 152 provided in the base 150. Cylindrical member 154 includes a center opening 156, which can optionally include a lip or shelf 158 at its upper area.

Figure 9:
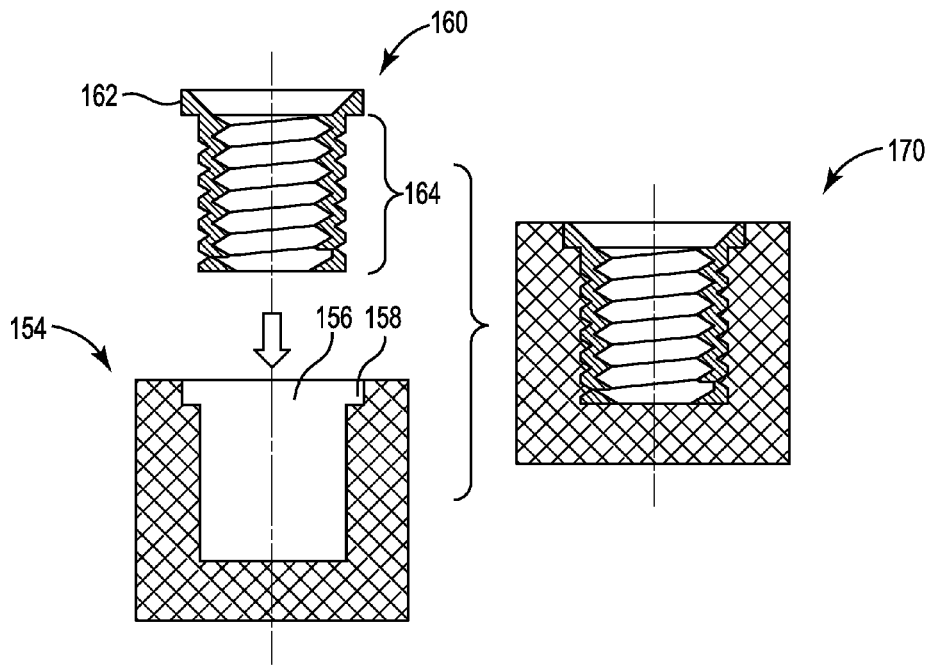
FIG. 9 is a schematic cross-sectional side view of a process for assembling a threaded insert into a metal rubber cylinder, such as the cylinder that is illustrated in FIG. 8.
Figure 10:
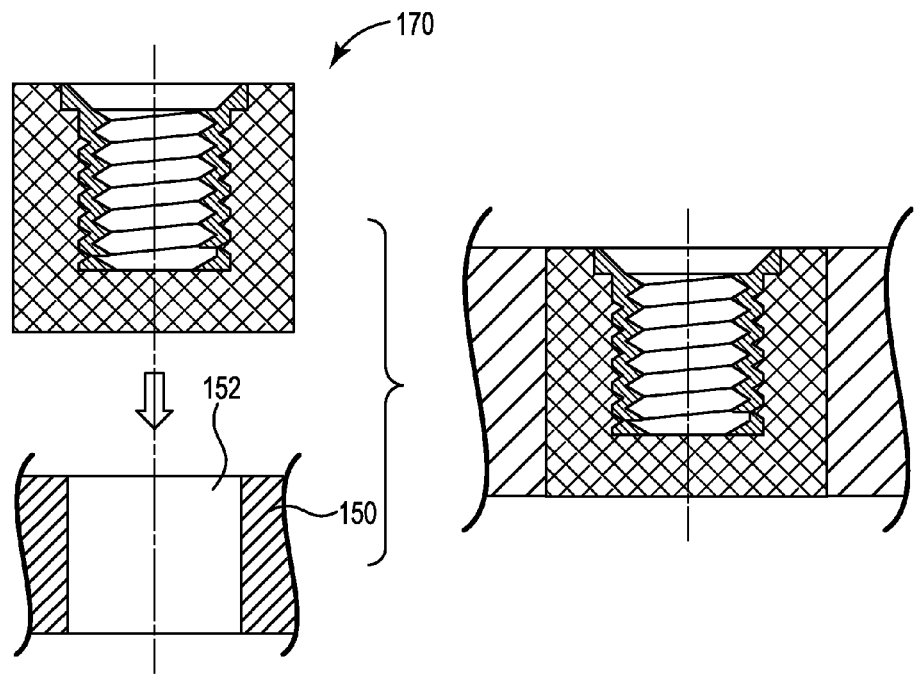
FIG. 10 is a schematic cross-sectional side view of the assembly of a threaded insert into a hole in a disk drive base, such as the hole in a base illustrated in FIGS. 7A and 7B, for example.

FIG. 9 illustrates a threaded insert 160 and the direction it will be moved for insertion into the center opening 156 of cylindrical member 154 of FIG. 8. Threaded insert 160 includes a lower threaded portion 164 having outer and inner threads, and an upper flange 162 that is generally designed to match the size and shape of the lip or shelf 158 of the cylindrical member 154. The threaded insert 160 can be bonded or otherwise secured to the cylindrical member 154, such as by glue or epoxy, to arrive at assembly 170. This assembly 170 can in turn be inserted into the hole 152 in base 150, as is illustrated in the schematic illustration of FIG. 10. Again, the assembly 170 can be bonded or otherwise secured within the hole 152, such as by glue or epoxy.

Figure 11:
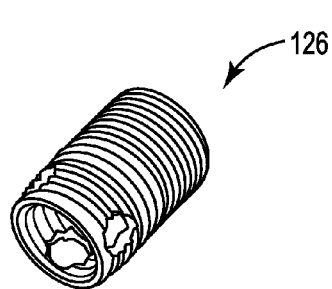
FIG. 11 is a perspective view of an exemplary threaded insert as can be utilized with the assemblies of the invention.
Figure 12:
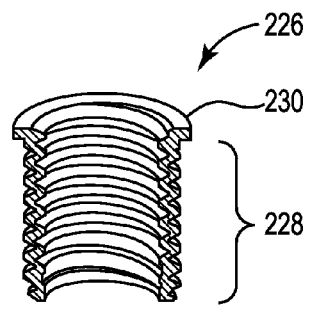
FIG. 12 is a perspective view of a cut portion of a threaded insert as can be utilized with the assemblies of the invention.

With regard to the threaded insert or threaded bushing, a standard or designed threaded insert can be used, which generally can include a member having both external and internal threads, although it is possible that the insert is provided with only internal threads. Such a threaded insert is positioned within a hole that is provided in the metal rubber cylinder in order to provide the desired threaded opening that accepts a screw for attachment of the hard disk drive to the chassis. FIGS. 11 and 12 illustrate exemplary threaded inserts that can be used, with threaded insert 126 of FIG. 11 illustrating a self-tapping insert that is insertable into a hole in such a way that it taps its own threads in the hole. FIG. 12 illustrates an threaded insert 226 of the type that is commercially available under the trade name "TIME-SERT", which is a solid bushing insert with both internal and external threads in area 228, along with a flange 230 at the top of the insert that provides for positive placement in a corresponding recess of the hole and that prevents the insert from moving further into the hole than desired.

Figure 13:
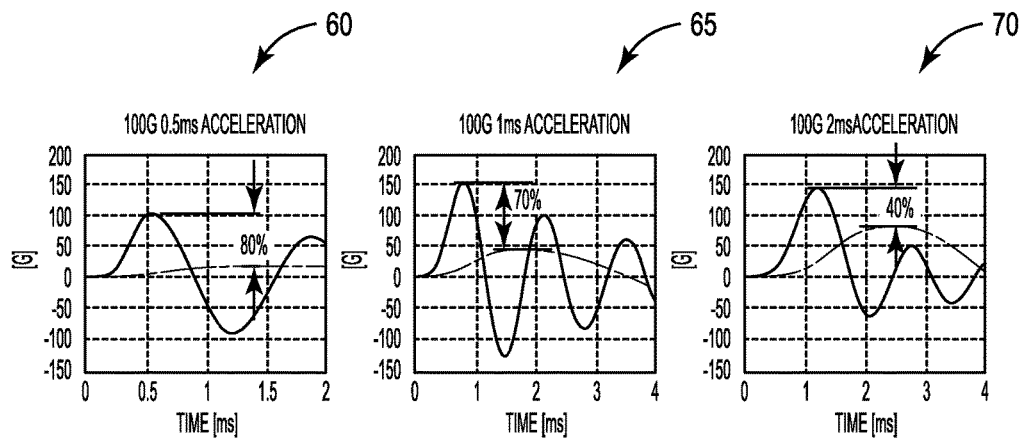
FIG. 13 includes multiple graphs, each of which illustrates the improvements in acceleration and deflection that are achieved with the use of the mounting systems of the invention.
Figure 13:
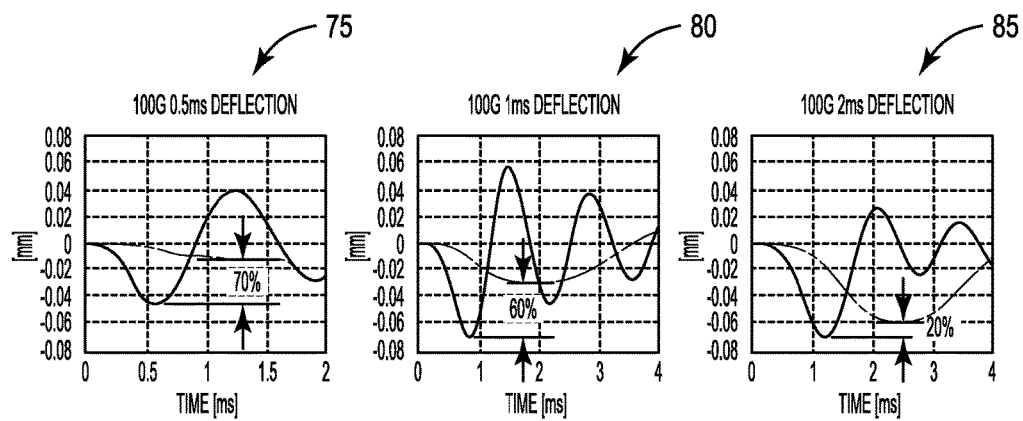

FIG. 13 illustrates exemplary performance graphs of the mounting of a hard disk drive to a chassis using traditional mounting with a screw (shown as a bold, solid line in each graph) and also when a hard disk drive is mounted to a chassis using metal rubber inserts of the type described above (shown as a broken line in each graph). In particular, graphs 60, 65, and 70 illustrate a difference of between 40% and 80% in the acceleration of a hard disk drive relative to a chassis when comparing a traditional mounting system and a mounting system of the invention that includes a metal rubber insert. Similarly, graphs 75, 80, and 85 illustrate a difference of between 20 and 70% in the deflection of a hard disk drive relative to a chassis when comparing a traditional mounting system and a mounting system of the invention that includes a metal rubber insert.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A hard disk drive mounting assembly comprising:
   a disk drive assembly comprising:
   a base structure that comprises a first opening;
   a damping insert positioned in the first opening, wherein the damping insert comprises a top surface, a bottom surface, and
   a second opening extending from the top surface toward the bottom surface, and wherein the damping insert comprises a woven metal rubber material having viscoelastic properties under shock that induces relative movement contact and compression between a plurality of strips of the woven metal rubber material; and
   a threaded insert positioned in the second opening of the damping insert, wherein the threaded insert comprises an inner opening that is at least partially threaded,
   wherein the threaded insert further comprises an outer threaded surface that is threadably engaged with an inner surface of the second opening of the damping insert.

2. The hard disk drive mounting assembly of claim 1, wherein the plurality of strips of the woven metal rubber material comprises a first set of strips and a second set of strips.

3. The hard disk drive mounting assembly of claim 2, wherein the first set of strips and the second set of strips comprise identical material properties.

4. The hard disk drive mounting assembly of claim 2, wherein the first set of strips and the second set of strips comprise different material properties.

5. The hard disk drive mounting assembly of claim 1, wherein the damping insert is a cylindrical member.

6. The hard disk drive mounting assembly of claim 1, in combination with a screw comprising outer threads that are engagable with threads of the inner opening of the threaded insert.

7. The hard disk drive mounting assembly of claim 1, wherein an outer surface of the damping insert is bonded to an inner surface of the first opening of the base structure.

8. The hard disk drive mounting assembly of claim 1, wherein the second opening only extends part of the distance from the top surface to the bottom surface of the damping insert.

9. The hard disk drive mounting assembly of claim 1, wherein the threaded insert further comprises an outer surface that is bonded to an inner surface of the second opening of the damping insert.

10. The hard disk drive mounting assembly of claim 1, wherein the damping insert is positioned entirely within the first opening of the base structure.

11. The hard disk drive mounting assembly of claim 1, wherein the second opening of the damping insert comprises a center opening extending along a portion of a height of the damping insert and an upper lip portion adjacent the center opening.

12. The hard disk drive mounting assembly of claim 11, wherein the center opening comprises a first diameter that is smaller than a second diameter of the upper lip portion.

13. The hard disk drive mounting assembly of claim 11, wherein the threaded insert further comprises an upper flange configured for positioning in the lip portion of the second opening of the damping insert.

\* \* \* \* \*